3,639,385
HETEROCYCLIC MONOAZO COMPOUNDS FROM N,N-DIARALKYL ANILINES AND POLYESTER TEXTILE MATERIALS DYED THEREWITH
Max A. Weaver and Herman S. Pridgen, Kingsport, Tenn., assignors to Eastman Kodak Company, Rochester, N.Y.
No Drawing. Filed July 26, 1968, Ser. No. 747,813
Int. Cl. C09b 29/08, 29/26; D06p 3/52
U.S. Cl. 260—158                                     9 Claims

ABSTRACT OF THE DISCLOSURE

Monoazo compounds having a heterocyclic diazo component and a 3-acylamido-N,N-diaralkylaniline coupling component are useful as dyes for polyester textile materials on which the compounds exhibit improved buildup and fastness properties, such as fastness to light and resistance to sublimation.

---

This invention relates to certain novel, water-insoluble monoazo compounds and, more particularly, to monoazo compounds useful as dyes for polyester textile materials and to polyester textile materials dyed with the novel compounds.

The novel azo compounds of the invention have the formula (I) 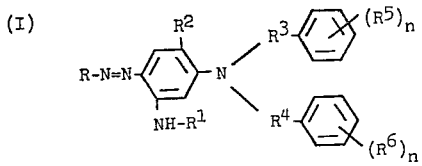

wherein
R is a 2-thiazolyl radical, a 2-benzothiazolyl radical, a 1,3,4-thiadiazol-2-yl radical, a 1,2,4-thiadiazol-5-yl radical, a 3-pyrazolyl radical, or a 2-thienyl radical;
$R^1$ is an acyl group;
$R^2$ is hydrogen, lower alkyl, or lower alkoxy;
$R^3$ and $R^4$ are the same or different and each is alkylene of 1 to about 2 carbon atoms;
$R^5$ and $R^6$ are the same or different and each is hydrogen, lower alkyl, lower alkoxy, hydroxy, or halogen; and
each $n$ is 1 or 2.

The novel compounds of the invention give yellow to blue dyeings when applied according to conventional dyeing procedures to polyester textile materials such as fibers, yarns, and fabrics. The novel azo compounds exhibit improved buildup and fastness properties, such as fastness to light and resistance to sublimation, on polyesters. The superior sublimation fastness possessed by the compounds of the invention renders them particularly useful in the thermal fixation technique of dyeing polyester materials.

The heterocyclic diazo component represented by R can be unsubstituted or, preferably, substituted with, for example, lower alkyl, lower alkoxy, aryl, nitro, halogen, lower alkylthio, lower alkoxycarbonylalkylthio, cyclohexylthio, arylthio, lower aralkylthio, formyl, lower alkanoyl, lower alkoxycarbonyl, aroyl, lower alkanoylamino, aroylamino, cyano, lower alkylsulfonyl, arylsulfonyl, lower alkylsulfonamido, trifluoromethyl, sulfamoyl, lower alkylsulfamoyl, carbamoyl, lower alkylcarbamoyl, thiocyanato, etc. The alkanoyl groups can be substituted with substituents such as halogen, phenyl, cyano, lower alkoxy, lower alkylthio, lower alkylsulfonyl, etc. The alkylsulfonyl groups can also be substituted, for example, with cyano, hydroxy, halogen and the like. The alkoxy-carbonyl groups can be substituted, for example, with hydroxy or cyano. As used herein to describe a group containing an alkyl moiety, "lower" designates a carbon content from 1 to about 4 carbon atoms. Examples of the alkyl and alkoxy groups which can be present on the diazo components include methyl, ethyl, isopropyl, propyl, butyl, methoxy, ethoxy, propoxy, butoxy, etc. Chlorine and bromine are typical halogen atoms. Methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxy-carbonyl, ethoxycarbonyl, propoxycarbonyl, 2-cyanoethoxycarbonyl, 2-hydroxyethoxycarbonyl, etc. are examples of the alkylsulfonyl, alkanoyl, and alkoxycarbonyl groups which can be present on the heterocyclic groups represented by R.

Acetamido, propionamido, methylsulfonamido, ethylsulfonamido, and butylsulfonamido are typical alkanoylamino and alkylsulfonamido substituents which can be present on the diazo component. Dimethylsulfamoyl, ethylsulfamoyl, butylsulfamoyl, diethylcarbamoyl, propylcarbamoyl, dibutylcarbamyl are examples of the alkylsulfamoyl and alkylcarbamoyl groups. The aryl groups which can be present on the diazo component including the aryl moiety of the arylthio, aralkylthio, aroyl and arylsulfonyl groups are preferably monocyclic, carbocyclic aryl such as phenyl and phenyl substituted, for example, with lower alkyl, e.g. tolyl; lower alkoxy, e.g. anisyl; halogen, e.g. chlorophenyl, bromophenyl; nitro, e.g. m-nitrophenyl; etc. Benzoyl, p-tolyl, p-chlorobenzoyl, p-nitrobenzoyl, p-ethoxyphenylthio, p-chlorobenzylthio, benzamido, p-tolylamino, p-tolylsulfonyl, p-ethoxyphenylsulfonyl, benzylthio, p-chlorobenzothio, etc. are examples of the aryl-containing groups which can be present on the heterocyclic groups represented by R. The acyl groups set forth below in the definition of $R^1$ are further examples of the groups which can be present on the diazo component.

Typical groups represented by R include 2-thiazolyl,
5-nitro-2-thiazolyl,
5-bromo-2-thiazolyl,
5-thiocyanato-2-thiazolyl,
4-trifluoromethyl-2-thiazolyl,
4-ethoxycarbonyl-2-thiazolyl,
5-cyano-2-thiazolyl,
5-acetamido-2-thiazolyl,
4-methylsulfonyl-2-thiazolyl,
4-methyl-5-nitro-2-thiazolyl,
2-benzothiazolyl,
6-methylsulfonyl-2-benzothiazolyl,
6-ethoxycarbonyl-2-benzothiazolyl,
6-cyano-2-benzothiazolyl,
6-sulfamoyl-2-benzothiazolyl,
6-thiaocyanato-2-benzothiazolyl,
6-N,N-dimethylsulfamoyl-2-benzothiazolyl,
4,6-dichloro-2-benzothiazolyl,
4-methyl-6-nitro-2-benzothiazolyl,
5-methyl-1,3,4-thiadiazol-2-yl,
5-thiocyanato-1,3,4-thiadiazol-2-yl,
5-cyclohexylthio-1,3,4-thiadiazol-2-yl,
5-ethylthio-1,3,4-thiadiazol-2-yl,
5-phenylthio-1,3,4-thiadiazol-2-yl,
5-acetamido-1,3,4-thiadiazol-2-yl,
5-chloro-1,3,4-thiadiazol-2-yl,
5-β-cyanoethylthio-1,3,4-thiadiazol-2-yl,
5-ethoxycarbonylmethylthio-1,3,4-thiadiazol-2-yl,
5-phenylsulfonyl-1,3,4-thiadiazol-2-yl,
3-methylsulfonyl-1,2,4-thiadiazol-5-yl,
3-butylthio-1,2,4-thiadiazol-5-yl,
4-cyano-3-pyrazolyl,
4-nitro-3-pyrazolyl, 4-carbamoyl-3-pyrazolyl,
4-cyano-2-phenyl-3-pyrazolyl,
4,5-dicyano2-phenylsulfonyl--3-pyrazolyl,
5-methyl-4-nitro-2-phenyl-3-pyrazolyl,
4-cyano-2-methyl-3-pyrazolyl,
4-methoxycarbonyl-2-phenyl-3-pyrazolyl,
5-acetyl-3-nitro-2-thienyl,
5-benzoyl-3-nitro-2-thienyl,
3-nitro-5-p-toluoyl-2-thienyl,
3,5-di(methylsulfonyl)-2-thienyl,
5-methylsulfonyl-3-nitro-2-thienyl,
5-ethylsulfamoyl-3-nitro-2-thienyl,
3-nitro-2-thienyl,
3,5-dinitro-2-thienyl,
5-ethoxycarbonyl-2-thienyl, etc.

Preferred groups represented by R have the formula

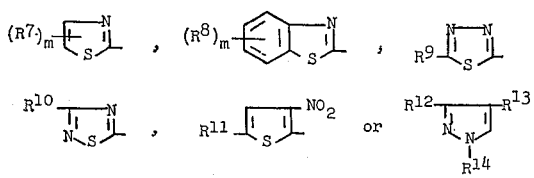

wherein $R^7$ is hydrogen, lower alkyl, lower alkoxy, nitro, halogen, lower alkylsulfonyl, carbamoyl, lower alkylcarbamoyl, lower alkoxycarbonyl, sulfamoyl, lower alkylsulfamoyl, cyano, thiocyanato, trifluoromethyl, phenyl or substituted phenyl; $R^8$ is hydrogen lower alkyl, lower alkoxy, nitro, halogen, lower alkylsulfonyl, substituted lower alkylsulfonyl, carbamoyl, lower alkylcarbamoyl, lower alkoxycarbonyl, sulfamoyl, lower alkylsulfamoyl, cyano, thiocyanato, lower alkylthio, cyclohexylthio, phenylthio, substituted phenylthio, or trifluoromethyl; $R^9$ is hydrogen, lower alkyl, lower alkoxy, halogen, lower alkylthio, benzylthio, cyclohexylthio, phenylthio, substituted phenylthio, phenyl, substituted phenyl, benzyl, lower alkylsulfonyl, lower alkanoylamino, lower alkylsulfonamido, benzamido, lower alkoxycarbonyl, lower alkoxycarbonylalkylthio, thiocyanato, sufamoyl, or lower alkylsulfamoyl; $R^{10}$ is lower alkylthio, cyclohexylthio, benzylthio, or lower alkylsulfonyl; $R^{11}$ is lower alkanoyl, benzoyl, or substituted benzoyl; $R^{12}$ is hydrogen, cyano, or lower alkyl; $R^{13}$ is cyano, carbamoyl, nitro, or lower alkoxycarbonyl; $R^{14}$ is hydrogen, lower alkyl, phenyl, substituted phenyl, lower alkylsulfonyl, phenylsulfonyl, or substituted phenylsulfonyl; and $m$ is 1 or 2. When $m$ is 2, the substituents represented by $R^6$ and $R^7$ can be the same or different.

The acyl groups represented by $R^1$ can be formyl, lower alkanoyl, aroyl, cyclohexylcarbonyl, lower alkoxycarbonyl, aryloxycarbonyl, lower alkylsulfonyl, arylsulfonyl, carbamoyl, lower alkylcarbamoyl, arylcarbamoyl, furoyl, etc. The alkanoyl, alkoxycarbonyl, and alkylsulfonyl groups can be substituted as described above relative to description of the alkanoyl, alkoxycarbonyl and alkylsulfonyl groups which can be present on the groups represented by R. Acetyl, propionyl, butyryl, cyanoacetyl, chloroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-hydroxyethylsulfonyl, and 2 - chloroethylsulfonyl are examples of the alkanoyl, alkoxycarbonyl, and alkylsulfonyl groups which $R^1$ can represent. The aryl group of the aroyl, aryloxycarbonyl, arylsulfonyl, and arylcarbamoyl group is preferably monocyclic, carbocyclic aryl such as unsubstituted phenyl and phenyl substituted with, for example, lower alkyl, lower alkoxy, halogen, hydroxy, etc. Tolyl, anisyl, p-bromophenyl, and o,p-dichlorophenyl are typical of such aryl groups. Dimethylcarbamoyl, ethylcarbamoyl, propylcarbamoyl, and butylcarbamoyl are illustrative alkylcarbamoyl groups which $R^1$ can represent.

Methyl, ethyl, propyl, butyl, methoxy, ethoxy, butoxy, chlorine, and bromine are examples of the substitutents which each of $R^5$ and $R^6$, as defined above, can represent. When $n$ is 2, the substituents represented by $R^5$ and $R^6$ can be the same or different.

Particularly fast dyeings on polyester materials are obtained from the compounds having the formula

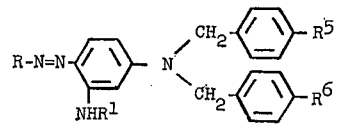

wherein
R represents a heterocyclic group having the formula

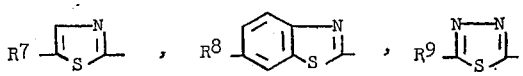

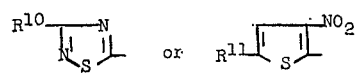

wherein
$R^7$ is cyano, nitro, lower alkylsulfonyl, or lower alkoxycarbonyl;
$R^8$ is cyano, nitro, lower alkylsulfonyl, lower alkoxycarbonyl, or thiocyanato;
$R^9$ is lower alkyl, lower alkylthio, cyclohexylthio, phenylthio, lower alkylsulfonyl, or lower alkoxycarbonyl;
$R^{10}$ is lower alkylthio or lower alkylsulfonyl; and
$R^{11}$ is lower alkanoyl, benzoyl, lower alkylbenzoyl, lower alkoxybenzoyl, halobenzoyl, or nitrobenzoyl;
$R^1$ is lower alkanoyl, benzoyl, lower alkoxycarbonyl, lower alkylsulfonyl, or lower alkylcarbamoyl; and
$R^5$ and $R^6$ each is hydrogen, methyl, methoxy, or chlorine.

The novel azo compounds of the invention are prepared according to known procedures by diazotizing a heterocyclic amine having the formula $R-NH_2$ coupling the resulting diazonium salt with a compound having the formula (II)

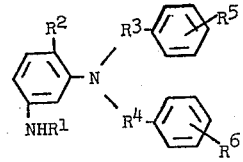

wherein
R, $R^1$, $R^2$, $R^3$, $R^4$, $R^5$ and $R^6$ are defined above. The heterocyclic amines $R-NH_2$ are known compounds and can be prepared by published techniques.

The coupler compounds of Formula II are prepared in accordance by methods analogous to procedures described in the literature. The couplers can be prepared by reacting a compound having the formula (III) 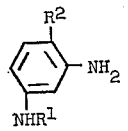

with a benzyl halide or an arylethyl halide. Couplers in which $R^3$ and $R^4$ and $R^5$ and $R^6$ are the same are obtained by reacting 2 equivalents of a benzyl halide or arylethyl halide with an amine of Formula II. The compounds of Formula II wherein $R^3$ and $R^4$ and/or $R^5$ and $R^6$ are different are prepared by reacting one equivalent of a benzyl halide or an arylethyl halide with amine III and then the resulting compound is reacted with a second benzyl halide or arylethyl halide. The above-described reactions are further illustrated by the following reactions:

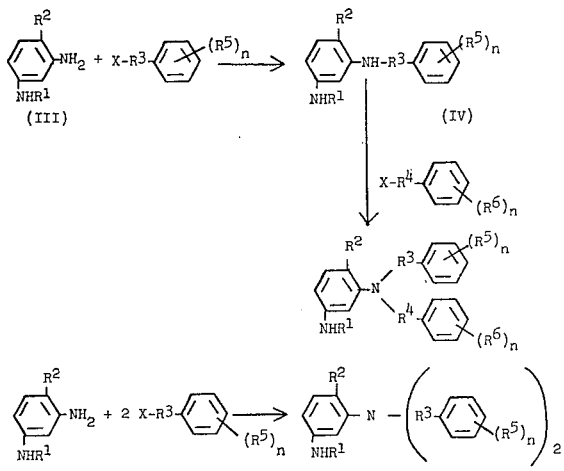

wherein X is halogen. The compounds of Formula IV can be prepared by condensing a benzaldehyde or arylacetaldehyde with amine III followed by hydrogenation of the resulting anil. The above-described synthesis of the couplers can be varied by substituting a nitroaniline having the formula

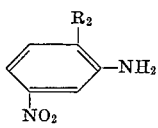

for amine (III). The nitro group of the intermediate N,N-disubstituted nitroaniline is hydrogenated and the resulting amino group is acylated.

The preparation of the couplers and representative azo compounds of the invention is further illustrated by the following example.

PREPARATION OF THE COUPLERS

Example 1

A mixture of 15.0 g. 3′-aminoacetanilide, 38.0 g. benzylchloride, and 25 ml. N,N - dimethylformamide are heated and stirred for 2 hr. at 95–105° C. Then 10.1 g. triethylamine is added, and the reaction is heated for another hour at 110–125° C. After drowning the reaction in water, the product, 3 - acetamido-N,N-dibenzylaniline, is collected by filtration, washed with water, and air dried; M.P. 140–142° C.

Example 2

A mixture of 15.0 g. 3′-aminoacetanilide, 12.7 g. benzyl chloride, and 25 ml. N,N - dimethylformamide are heated for 12 minutes at 60–65° C. and then drowned in 350 ml. water. The product is collected by filtration and recrystallized from 250 ml. of benzene and 60 ml. of hexane. The product obtained, 3-acetamido-N-benzylaniline, melts at 129–130° C.

Example 3

A mixture of 18.0 g. 3′ - nitroacetanilide, 2.0 g. sodium acetate, 31.8 g. benzaldehyde, 150 ml. ethanol, and 3 g. Raney nickel is hydrogenated at 75° C. and 1500 p.s.i. until the hydrogen uptake ceases. Ethanol (100 ml.) is added to the product from the autoclave. After heating to dissolve the product, the Raney nickel is removed by filtration. After removing most of the solvent by evaporation, the residue is poured into water. The product is collected by filtration, washed with water, and air dried. It melts at 128–130° C. and is identical to that prepared by the procedure of Example 2.

Example 4

3′ - aminoacetanilide (15.0 g.), 2 - phenylethylbromide (18.5 g.) and N,N - dimethylformamide (25 ml.) are heated at 80° C. for 1.25 hr. The reaction mixture is drowned into water. The slightly gummy product, 3-acetamido - N - (2 - phenylethyl)aniline, is collected by filtration and air dried.

Example 5

A mixture of 3-acetamido-N-(2-phenylethyl)aniline (2.5 g.), benzylchloride (2.6 g.), and N,N-dimethylformamide (3.0 ml.) are heated at 95° C. for 0.5 hr. Triethylamine (2 g.) is added and the heating continued for 0.5 hr. The reaction is drowned into water. The product, 3-acetamido-N-benzyl-N-(2-phenylethyl)aniline, is washed by decantation; it is a light amber viscous material.

Example 6

3′-aminoacetanilide (8.0 g.), α-chloro-p-xylene (21.0 g.), and 50 ml. N,N-dimethylformamide are heated at 95° C. for 1.5 hr. with stirring. Then 25 ml. of triethylamine is added and heating continued 7 hr. longer. The reaction mixture is drowned into water, and the product collected by filtration, washed with water, and air dried. The product, 3-acetamido-N,N-(di-p-methylbenzyl)aniline, melts at 161–162° C.

Example 7

A mixture of 5-acetamido-2-methoxyaniline (18.0 g.), benzyl chloride (38.0 g.), and N,N-dimethylformamide are heated and stirred at 95° C. for 1 hr. Then triethylamine (26 ml.) is added, and the reaction is heated 2 hr. longer. After drowning in water, the product is collected by filtration and recrystallized from 250 ml. methanol plus a little water. The product, 5-acetamido-N,N-dibenzyl-2-methoxyaniline, melts at 138–139.5° C.

Example 8 m-Nitroaniline (69.0 g.), benzyl chloride (133.0 g.), and N,N-dimethylformamide (250 ml.) are heated at 130° C. for 6 hr. The reaction mixture is drowned in a hot water-methanol solution; the product crystallizes on stirring. After collection of the product by filtration, it is recrystallized from methanol to give 129 g. of yellow solid, N,N-dibenzyl-3-nitroaniline, which melts at 78–80° C. N,N-dibenzyl-3-nitroaniline (129 g.) is hydrogenated in 800 ml. of 2B-alcohol using Raney nickel catalyst (14.0 g.). The reaction is carried out at 75° C. and at 1500 p.s.i. and requires about 3 hr. The Raney nickel catalyst is then removed by filtration. Upon concentration of the filtrate to about one-third of the original volume, the product separates and is collected by filtration and dried in air. The yield is 103 g. of N,N-dibenzyl-m-phenylenediamine melting at 98–100° C.

Example 9

N,N-dibenzyl-m-phenylenediamine (14.4 g.), toluene (30.0 ml.), and propionic anhydride (5.0 ml.) are heated at 95–100° C. for 3 hr. with stirring. The reaction mixture is drowned with hexane, and the product is collected by filtration. It is recrystallized from a 3:1 benzene/hexane solution. The yield is 11.3 g. of N,N-dibenzyl-3-propionamidoaniline melting at 133–134° C.

Analysis.—Calcd. for $C_{23}H_{24}N_2O$ (percent): C, 80.2; H, 7.04; N, 8.13. Found (percent): C, 80.35; H, 6.97; N, 7.83.

Example 10

N,N-dibenzyl-m-phenylenediamine (8.64 g.), toluene (20.0 ml.) and formic acid (3.0 ml.) are heated at 95–100° C. for 4 hr., and then the reaction mixture is drowned in a water/methanol mixture. The product, N,N-dibenzyl-3-formamidoaniline, is collected by filtration; M.P. 95–98° C.

Analysis.—Calcd. for $C_{21}H_{20}N_2O$ (percent): C, 79.7; H, 6.38; N, 8.86. Found (percent): C, 79.9; H, 5.9; N, 8.73.

Example 11

To a solution of N,N-dibenzyl-m-phenylenediamine (5.76 g.) in dioxane (15 ml.) is added ethyl chloroformate (2.48 g.) and the solution is heated on steam bath for 30 min. The reaction mixture is poured slowly into 400 ml. hexane. The product, N,N-dibenzyl-3-ethoxyformamidoaniline, crystallizes on stirring and is collected by filtration.

Example 12

To a solution of 8.64 g. of N,N-dibenzyl-m-phenylenediamine in 20 ml. of pyridine is added 4.0 g. of methanesulfonyl chloride. After stirring at 95–100° C. for 2 hr., the reaction is drowned in 600 ml. of dilute HCl solution. The aqueous portion is decanted and the product recrystallized from ethanol to yield 3-methanesulfonamido-N,N-dibenzylaniline melting at 113–114° C.

Example 13

To a solution of N,N-dibenzyl-m-phenylenediamine (5.76 g.) in dioxane (15.0 ml.) is added p-toluenesulfonyl chloride (4.75 g.). The reaction is heated on a steam bath for 2 hr. and then is drowned in water. The product crystallizes and then is collected by filtration. After recrystallizing from methanol the product, 3-(p-toluenesulfonamido)-N,N-dibenzylaniline melts at 134–135° C.

Example 14

To a solution of N,N-dibenzyl-m-phenylenediamine (8.64 g.) in toluene (20 ml.) is added ethyl isocyanate (2.12 g.). The reaction mixture is heated on a steam bath for 30 min. On cooling the product crystallizes and is collected by filtration. The product, N,N-dibenzyl-3-(3-ethylureido)aniline, is recrystallized from a methanol-water solution and melts at 154–157° C.

Analysis.—Calcd. for $C_{23}H_{25}N_3O$ (percent): C, 77.0; H, 6.76; N, 11.7. Found (percent): C, 77.0; H, 6.5; N, 11.6.

Example 15

To a solution of N,N-dibenzyl-m-phenylenediamine (8.64 g.) in 15 ml. of dioxane is added 2-furoyl chloride (4.3 g.). The reaction is heated with stirring on a steam bath for 15 min. and then is drowned in water. The aqueous portion is removed by decantation and the product is recrystallized from methanol. The product, N,N-dibenzyl-3-(2-furoylamido)aniline, melts at 145–148° C.

Analysis.—Calcd. for $C_{25}H_{22}N_2O_2$ (percent): C, 78.5; H, 5.8; N, 7.3. Found (percent): C, 78.3; H, 5.4; N, 6.9.

Example 16

3-cyclohexylformamidoaniline (10.9 g.), benzyl chloride (13.35 g.), and N,N-dimethylformamide (25 ml.) are heated at 130° C. for 4 hr. The reaction is then drowned in a methanol-water solution. The product, 3-(1-cyclohexylformamido)-N,N-dibenzylaniline, crystallizes after stirring for a few minutes. It melts at 180–181° C.

Example 17

3′-aminobenzanilide (10.6 g.) is reacted with benzyl chloride (13.35 g.) exactly as in Example 16 to give 3-(benzamido)-N,N-dibenzylaniline, which melts at 169–171° C.

Example 18

3′-aminoacetanilide (7.5 g.), p-chlorobenzyl chloride (24.2 g.), and N,N-dimethylformamide (25.0 ml.) are heated on a steam bath for 4 hr.; during this time 10 ml. of triethylamine is added portionwise. The reaction mixture is drowned in 600 ml. water plus 50 ml. of methanol. It is collected by filtration, dried in air, and recrystallized from a benzene-hexane solution. The yield is 19.7 g. of 3-acetamido-N,N-bis(p-chlorobenzyl)aniline which melts at 174–177° C.

Example 19

2-methoxy-5-acetamidoaniline (9.0 g.), N,N-dimethylformamide (15 ml.), and p-chlorobenzyl chloride (24.2 g.) are heated on a steam bath for 1 hr. Triethylamine (25 ml.) is added and the reaction heated 3 hrs. longer. It is then drowned in water and recrystallized from a benzene-hexane solution. The yield is 20.8 g. of 5-acetamido-N,N-bis(p-chlorobenzyl)-2-methoxy-aniline which melts at 153–158° C.

Analysis.—Calcd. for $C_{23}H_{22}Cl_2N_2O$ (percent): C, 64.4; H, 5.2; N, 6.5; Cl, 16.5. Found (percent): C, 64.4; H, 5.5; N, 6.4; Cl, 6.5.

Example 20

5-acetamido-2-methoxyaniline (9.0 g.), N,N-dimethylformamide (15 ml.), p-methylbenzylchloride (17.5 g.), and 25 ml. of triethylamine are reacted as illustrated by Example 19 to yield 5-acetamido-N,N-bis-(p-methylbenzyl)-2-methoxyaniline which melts at 185–187° C.

Example 21

5-acetamido-2-methylaniline (16.4 g.), N,N-dimethylformamide (50.0 ml.), and benzylchloride (37.8 g.) are heated at 110° C. for 8 hrs. The product is collected by filtration, washed with water, and recrystallized from 200 ml. of methanol. The product, 5-acetamido-N,N-dibenzyl-2-methylaniline, melts at 181–182° C.

Analysis.—Calcd. for $C_{23}H_{22}N_2O$ (percent): C, 75.3; H, 7.1; N, 11.0. Found (percent): C, 75.7; H, 7.0; N, 10.9.

Example 22

To 2.9 g. of 2-amino-5-nitrothiazole, stirred in 25 ml. of water, is added 13.6 ml. of conc. $H_2SO_4$. Solution occurs immediately. The solution is cooled to −10° C. and a solution of 1.4 g. $NaNO_2$ in 10 ml. of conc. $H_2SO_4$ is added below −5° C. Stirring is continued at about −5° C. for 15 min.; the diazonium solution is added to a chilled solution of 7.6 g. of 3-acetamido-N,N-dibenzylaniline dissolved in 100 ml. of 15% $H_2SO_4$ plus 100 ml. of 1:5 acid at about 0° C. The reaction mixture is allowed to stand at 0–5° C. for 30 min.; the coupling mixture is then drowned in water. The product is collected by filtration, washed with water, and dried in air. The azo compound obtained produces heavy reddish-blue shades on polyester fibers and has the structure:

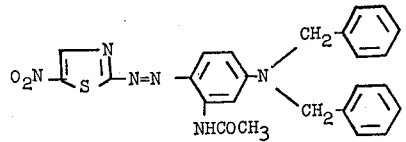

Example 23

2-amino-5-nitrothiazole (1.45 g.) is diazotized and coupled with 3.60 g. of 5-acetamido-2-methoxy-N,N-dibenzylaniline according to the procedure employed in Example 22. The resulting azo dye gives fast blue dyeings on polyester fibers and has the formula

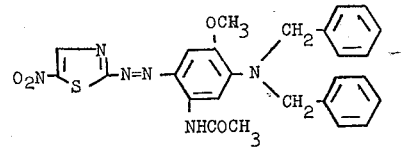

Example 24

To 5 ml. of conc. $H_2SO_4$ is added 0.72 g. dry $NaNO_2$ portionwise with stirring. The solution is cooled and 10 ml. of 1:5 acid is added below 15° C. The mixture is cooled further and 1.43 g. of 2-amino-5-carbamylthiazole is added followed by 10 ml. 1:5 acid, all at 0–5° C. After diazotizing at 0–5° C. for 2 hrs. the solution is added to a chilled solution of 3.30 g. 3-acetamido-N,N-dibenzylaniline dissolved in 100 ml. of 1:5 acid. The coupling is buffered with ammonium acetate until it is neutral to Congo Red paper. After coupling 2 hrs. at 0–5° C., the reaction is drowned in water. The product is collected by filtration, washed with water, and dried in air. The dye colors polyester fibers bright red shades and has the following structure:

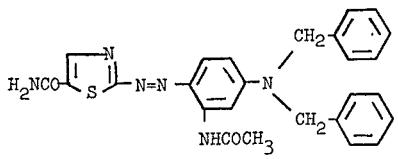

The thiazolylazo compounds of the examples of Table I are prepared by diazotizing the appropriate 2-aminothiazole coupling it with the appropriate coupler as described in Examples 22 and 24. The azo compounds of Table I conform to the general formula

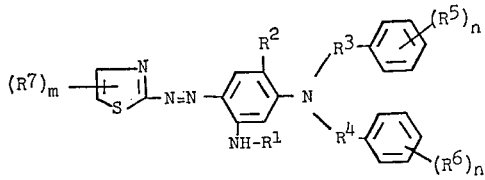

In Table I, as in Tables II–VI, the color recited in each example refers to dyeings of each compound on polyester fibers.

The coupling is buffered with solid ammonium acetate and allowed to react at about 5° C. for 2 hr. After drowning in water, the product is collected by filtration, washed with water, and dried in air. The product produces bright red shades on polyester fibers and has the structure:

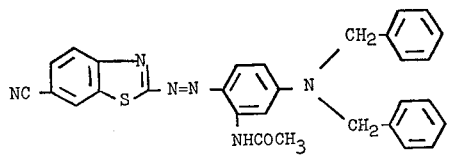

Example 66

To 2.28 g. of 2-amino-6-methylsulfonylbenzothiazole stirred in 24 ml. of water is added 26.2 g. of conc. $H_2SO_4$. After all of the amine has dissolved, the solution is cooled and a solution of 0.84 g. of $NaNO_2$ in 5.0 ml. of conc. $H_2SO_4$ is added portionwise below 0° C. The diazotization is stirred at about 0° C. for 2 hr. and then the solution is added to a chilled solution of 3.30 g. 3-acetamido-N,N-dibenzylaniline in 50 ml. 15% $H_2SO_4$ plus 50 ml. of 1:5 acid, all at about 5° C. After allowing to couple 1 hr. at 0–5° C., the dye is drowned in water, filtered, washed with water, and air dried. The azo compound obtained gives red dyeings, which exhibit excellent fastness properties, on polyester fibers. The structure is as follows:

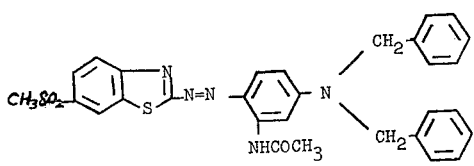

TABLE I

| Example No. | $(R^7)_m$ | $R^1$ | $R^2$ | $R^3$ | $R^4$ | $(R^5)_n$ | $(R^6)_n$ | Color |
|---|---|---|---|---|---|---|---|---|
| 25 | 5-NO$_2$ | —COCH$_3$ | H | —CH$_2$CH$_2$— | —CH$_2$— | —H | —H | Blue. |
| 26 | 5-NO$_2$ | —COCH$_3$ | H | —CH$_2$CH$_2$— | —CH$_2$CH$_2$— | —H | —H | Do. |
| 27 | 5-NO$_2$ | —COCH$_3$ | H | —CH$_2$— | —CH$_2$— | 4-CH$_3$ | —H | Do. |
| 28 | 5-NO$_2$ | —COOC$_2$H$_5$ | H | —CH$_2$— | —CH$_2$— | —H | —H | Do. |
| 29 | 5-NO$_2$ | —COC$_5$H$_6$ | H | —CH$_2$— | —CH$_2$— | —H | —H | Do. |
| 30 | 5-NO$_2$ | —COC$_6$H$_{11}$ | H | —CH$_2$— | —CH$_2$— | —H | —H | Do. |
| 31 | 5-NO$_2$ | —COCH$_3$ | —OCH$_3$ | —CH$_2$— | —CH$_2$— | 4-CH$_3$ | 4-CH$_3$ | Do. |
| 32 | 5-NO$_2$ | —COCH$_3$ | —OCH$_3$ | —CH$_2$CH$_2$— | —CH$_2$CH$_2$— | 4-CH$_3$ | 4-CH$_3$ | Do. |
| 33 | 5-NO$_2$ | —COCH$_3$ | —OCH$_3$ | —CH$_2$— | —CH$_2$— | 3-CH$_3$ | 4-CH$_3$ | Do. |
| 34 | 5-NO$_2$ | —COCH$_3$ | —OCH$_3$ | —CH$_2$— | —CH$_2$— | 4-OCH$_3$ | 4-OCH$_3$ | Do. |
| 35 | 5-NO$_2$ | —SO$_2$C$_4$H$_9$-n | —OCH$_3$ | —CH$_2$— | —CH$_2$— | —H | 4-OCH$_3$ | Do. |
| 36 | 5-NO$_2$ | —COCH$_3$ | —OCH$_3$ | —CH$_2$— | —CH$_2$— | —H | 4-OH | Do. |
| 37 | 5-NO$_2$ | —COCH$_3$ | —CH$_3$ | —CH$_2$— | —CH$_2$— | —H | —H | Do. |
| 38 | 5-NO$_2$ | —COOC$_2$H$_5$ | —CH$_3$ | —CH$_2$— | —CH$_2$— | —H | —H | Do. |
| 39 | 5-NO$_2$ | —SO$_2$CH$_3$ | H | —CH$_2$— | —CH$_2$— | —H | —H | Do. |
| 40 | 5-NO$_2$ | —SO$_2$-C$_6$H$_4$-Cl | H | —CH$_2$— | —CH$_2$— | —H | —H | Do. |
| 41 | 5-NO$_2$ | —SO$_2$-C$_6$H$_4$-CH$_3$ | H | —CH$_2$— | —CH$_2$— | —H | —H | Do. |
| 42 | 5-NO$_2$ | —CONHC$_2$H$_5$ | H | —CH$_2$— | —CH$_2$— | —H | —H | Do. |
| 43 | 5-CONH$_2$ | —COC$_6$H$_5$ | H | —CH$_2$— | —CH$_2$— | —H | —H | Red. |
| 44 | 5-CONH$_2$ | —COOC$_2$H$_5$ | —CH$_3$ | —CH$_2$— | —CH$_2$— | —H | —H | Red. |
| 45 | 5-CONH$_2$ | —COCH$_3$ | —CH$_3$ | —CH$_2$— | —CH$_2$— | 4-CH$_3$ | 4-CH$_3$ | Red. |
| 46 | 5-CN | —COCH$_3$ | —CH$_3$ | —CH$_2$— | —CH$_2$— | 4-CH$_3$ | 4-CH$_3$ | Violet. |
| 47 | 5-CN | —COCH$_3$ | —CH$_3$ | —CH$_2$CH$_2$— | —CH$_2$CH$_2$— | —H | —H | Do. |
| 48 | 5-CN | —COCH$_{33}$ | —CH$_3$ | —CH$_2$— | —CH$_2$— | —H | —H | Do. |
| 49 | 5-CN | —COOC$_2$H$_5$ | —CH$_3$ | —CH$_2$— | —CH$_2$— | —H | —H | Do. |
| 50 | 5-Br | —COCH$_3$ | —CH$_3$ | —CH$_2$— | —CH$_2$— | —H | —H | Red. |
| 51 | 5-Br | —CHO | —CH$_3$ | —CH$_2$— | —CH$_2$— | —H | —H | Red. |
| 52 | 5-Br | —COCH$_2$CH$_2$Cl | —CH$_3$ | —CH$_2$— | —CH$_2$— | —H | —H | Red. |
| 53 | 5-SO$_2$CH$_3$ | —COCH$_3$ | —CH$_3$ | —CH$_2$— | —CH$_2$— | —H | —H | Violet. |
| 54 | 4-C$_6$H$_5$ | —COCH$_3$ | —CH$_3$ | —CH$_2$— | —CH$_2$— | 4-OH | 4-OH | Red. |
| 55 | 4-CH$_3$ | —COCH$_3$ | —CH$_3$ | —CH$_2$— | —CH$_2$— | —H | —H | Red. |
| 56 | 4-CH$_3$-5-SCN | —COCH$_3$ | —CH$_3$ | —CH$_2$— | —CH$_2$— | 2,4-di-CH$_3$ | 2,4-di-CH$_3$ | Red. |
| 57 | 5-SO$_2$C$_4$H$_9$-n | —COCH$_3$ | —CH$_3$ | —CH$_2$— | —CH$_2$— | —H | —H | Violet. |
| 58 | 4-CF$_3$ | —COCH$_3$ | —CH$_3$ | —CH$_2$— | —CH$_2$CH$_2$— | 2-4-di-Cl | —H | Red. |
| 59 | 5-Cl | —COCH$_3$ | —CH$_3$ | —CH$_2$— | —CH$_2$— | —H | —H | Red. |
| 60 | 5-COOC$_2$H$_5$ | —COCH$_3$ | —CH$_3$ | —CH$_2$— | —CH$_2$— | —H | —H | Red. |
| 61 | 4-NHCOCH$_3$ | —COCH$_3$ | —CH$_3$ | —CH$_2$— | —CH$_2$— | —H | —H | Red. |
| 62 | 4-CH$_3$-5-NO$_2$ | —COCH$_3$ | —CH$_3$ | —CH$_2$— | —CH$_2$— | —H | —H | Blue. |
| 63 | 4-CH$_3$-5-NO$_2$ | —COCH$_3$ | —OCH$_3$ | —CH$_2$— | —CH$_2$— | —H | —H | Do. |
| 64 | —H | —H | —H | —CH$_2$— | —CH$_2$— | —H | —H | Red. |

Example 65

Sodium nitrite (0.76 g.) is added portionwise to 5 ml. of conc. $H_2SO_4$. This solution is cooled in an ice bath and 10 ml. 1:5 acid is added, keeping the temperature below 15° C. The mixture is stirred at 0–5° C. and 1.75 g. of 2-amino-6-cyanobenzothiazole is added, followed by 10 ml. of 1:5 acid. The diazotization is stirred at 0–5° C. for 2 hr. and is then added to a solution of 3.30 g. 3-acetamido-N,N-dibenzylaniline in 100 ml. of 1:5 acid.

Example 67

A solution of 0.72 g. NaNO₂ in 5 ml. of concentrated H₂SO₄ cooled to about −5° C. is added to 1.95 g. 2-amino-6-nitrobenzothiazole in 24 ml. water and 14 ml. of concentrated H₂SO₄ below 0° C. After stirring at about 0° C. for 2 hours, the diazotization solution is added to a solution of 2.25 g. N,N-di-(p-chlorobenzyl)-3-methylsulfonamidoaniline in a mixture of 50 ml. of 15% H₂SO₄ and 50 ml. 1:5 acid, all at about 0° C. The coupling mixture is allowed to couple 2 hours at ice-bath temperature and it then is drowned in water. The azo compound is collected by filtration, washed with water, and air dried. The product dyes polyester fibers fast violet shades and has the structure:

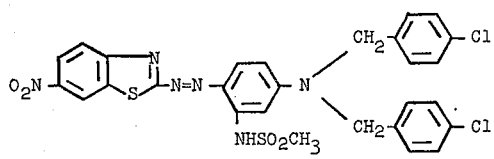

The compounds set forth in the examples of Table II, which conform to the general formula

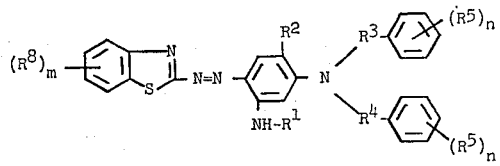

are prepared according to the procedures employed in Examples 65, 66 and 67.

further and 1.61 g. 2-amino-5-ethylthio-1,3,4-thiadiazole is added followed by 10 ml. 1:5 acid, all below 5° C. After stirring for 2 hr. at 0–5° C., the diazonium solution is added to a chilled solution of 3.30 g. 3-acetamido-N,N-dibenzylaniline in 100 ml. of 1:5 acid below 5° C. The reaction is kept cold and ammonium acetate added until the coupling mixture is neutral to Congo Red test paper. After allowing to couple 1 hr. at about 5° C., the reaction mixture is drowned in water. The product is collected by filtration, washed with water, and dried in air. The dye produces bright red shades on polyester fibers which exhibit excellent light and sublimation fastness. This azo compound has the structure:

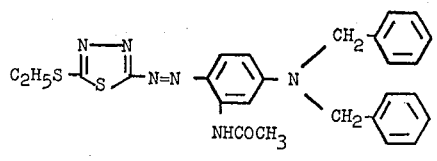

Example 114

To a solution of nitrosyl sulfuric acid, prepared by careful addition of 0.72 g. sodium nitrite to 5 ml. concentrated H₂SO₄ below 80° C. and cooled to 15° C. in an ice bath, is added 10 ml. 1:5 acid (1 part propionic acid:5 parts acetic acid). The resulting solution is cooled to 3° C. and 1.79 g. 5-methylsulfonyl-2-amino-1,3,4-thiadiazole is added with stirring. An additional 10 ml. of 1:5 acid is added below 5° C. and the solution is stirred for 1½ hours at 0–5° C. The diazotization solution is then added to a chilled solution of 3.59 g. N,N-dibenzyl-

TABLE II

| Example No. | $(R^8)_m$ | $R^1$ | $R^2$ | $R^3$ | $R^4$ | $(R^5)_n$ | $(R^6)_n$ | Color |
|---|---|---|---|---|---|---|---|---|
| 68 | 6-CN | —COCH₃ | —H | —CH₂CH₂— | —CH₂— | H | H | Red. |
| 69 | 6-CN | —COCH₃ | —H | —CH₂CH₂— | —CH₂CH₂— | H | H | Red. |
| 70 | 6-CN | —COCH₃ | —H | —CH₂— | —CH₂— | 4-CH₃ | 4-CH₃ | Red. |
| 71 | 6-CN | —COCH₃ | —OCH₃ | —CH₂— | —CH₂— | 4-CH₃ | 4-CH₃ | Violet. |
| 72 | 6-CN | —COCH₃ | —CH₃ | —CH₂— | —CH₂— | 4-CH₃ | 4-CH₃ | Do. |
| 73 | 6-SO₂CH₃ | —COOC₂H₅ | —H | —CH₂— | —CH₂— | 4-CH₃ | 4-CH₃ | Red. |
| 74 | 6-SO₂CH₃ | —COC₆H₅ | —H | —CH₂— | —CH₂— | —H | —H | Red. |
| 75 | 6-SO₂CH₃ | —CONHC₂H₅ | —H | —CH₂— | —CH₂— | —H | —H | Red. |
| 76 | 6-SO₂CH₃ | —COC₃H₇ | CH₃ | —CH₂— | —CH₂— | —H | —H | Red. |
| 77 | 6-SO₂CH₃ | 2-furoyl | H | —CH₂— | —CH₂— | —H | —H | Red. |
| 78 | 6-NO₂ | —COCH₃ | H | —CH₂— | —CH₂— | —H | —H | Violet. |
| 79 | 6-NO₂ | —COOC₂H₅ | H | —CH₂— | —CH₂— | —H | —H | Do. |
| 80 | 6-NO₂ | —COC₂H₅ | H | —CH₂— | —CH₂— | —H | —H | Do. |
| 81 | 6-NO₂ | —COC₂H₅ | H | —CH₂— | —CH₂— | 4-CH₃ | —H | Do. |
| 82 | 6-NO₂ | —COC₂H₅ | H | —CH₂— | —CH₂— | 3-CH₃ | —H | Do. |
| 83 | 6-NO₂ | —COCH₃ | H | —CH₂— | —CH₂— | 3-CH₃ | —H | Do. |
| 84 | 6-NO₂ | —COCH₃ | —OCH₃ | —CH₂— | —CH₂— | 3-CH₃ | —H | Blue. |
| 85 | 6-NO₂ | —COCH₃ | —OCH₃ | —CH₂— | —CH₂— | 4-OCH₃ | —H | Do. |
| 86 | 6-NO₂ | —COCH₃ | —OCH₃ | —CH₂— | —CH₂— | 4-OCH₃ | 4-OCH₃ | Do. |
| 87 | 6-NO₂ | —COCH₃ | —CH₃ | —CH₂— | —CH₂— | 4-OCH₃ | 4-OCH₃ | Do. |
| 88 | 4,6-di-NO₂ | —COCH₃ | —CH₃ | —CH₂— | —CH₂— | 4-OCH₃ | 4-OCH₃ | Do. |
| 89 | 4,6-di-NO₂ | —COCH₃ | —OCH₃ | —CH₂— | —CH₂— | 4-OCH₃ | 4-OCH₃ | Do. |
| 90 | 4,6-di-NO₂ | —COCH₃ | —H | —CH₂— | —CH₂— | —H | —H | Do. |
| 91 | 4-Br-6-SO₂CH₃ | —COCH₃ | —OCH₃ | —CH₂— | —CH₂— | —H | —H | Do. |
| 92 | 4-Cl-6-CN | —COCH₃ | —H | —CH₂— | —CH₂— | —H | —H | Violet. |
| 93 | 6-SCN | —COCH₃ | —H | —CH₂— | —CH₂— | —H | —H | Red. |
| 94 | 6-SCN | —COOC₂H₅ | —H | —CH₂— | —CH₂— | —H | —H | Red. |
| 95 | 6-SCN | —COCH₃ | —H | —CH₂CH₂— | —CH₂CH₂— | —H | —H | Red. |
| 96 | 6-SCN | —COCH₃ | —H | —CH₂— | —CH₂— | —H | —H | Red. |
| 97 | 6-SCN | —COCH₃ | —H | —CH₂— | —CH₂— | 4-CH₃ | 4-CH₃ | Red. |
| 98 | 4-Cl-6-SCH₃ | —COCH₃ | —H | —CH₂— | —CH₂— | —H | H | Red. |
| 99 | 4-Cl-6-SCH₃ | —COCH₃ | —OCH₃ | —CH₂— | —CH₂— | —H | H | Violet. |
| 100 | 6-Cl | —COCH₃ | —H | —CH₂CH₂— | —CH₂— | 2-Cl | H | Red. |
| 101 | 6-Cl | —COCH₃ | —H | —CH₂— | —CH₂— | 2-OH | H | Red. |
| 102 | 6-Br | —COCH₃ | —H | —CH₂— | —CH₂— | —H | H | Red. |
| 103 | 6-SO₂NH₂ | —COCH₃ | —H | —CH₂— | —CH₂— | —H | H | Red. |
| 104 | 6-SO₂N(CH₃)₂ | —COCH₃ | —H | —CH₂— | —CH₂— | —H | H | Red. |
| 105 | 6-SO₂C₂H₄CN | —COCH₃ | —H | —CH₂— | —CH₂— | —H | H | Red. |
| 106 | 6-COOC₂H₅ | —COCH₃ | —H | —CH₂— | —CH₂CH₂— | 2,4-di-OC₂H₅ | H | Red. |
| 107 | 6-CONH₂ | —COCH₃ | —H | —CH₂— | —CH₂CH₂— | 2,4-di-OC₂H₅ | H | Red. |
| 108 | 6-SCH₃ | —COCH₃ | —H | —CH₂— | —CH₂CH₂— | 2,4-di-OC₂H₅ | H | Red. |
| 109 | 6-NHCOCH₃ | —COCH₃ | —H | —CH₂— | —CH₂CH₂— | 2,4-di-OC₂H₅ | H | Red. |
| 110 | 6-CH₃ | —COCH₃ | —H | —CH₂— | —CH₂CH₂— | 2,4-di-OC₂H₅ | H | Red. |
| 111 | 6-C₆H₅ | —COCH₃ | —H | —CH₂— | —CH₂CH₂— | 2,4-di-OC₂H₅ | H | Red. |
| 112 | —H | —COCH₃ | —H | —CH₂— | —CH₂CH₂— | 2,4-di-OC₂H₅ | H | Red. |

Example 113

Sodium nitrite (0.72 g.) is added portionwise to 5 ml. of conc. H₂SO₄. The solution is cooled and 10 ml. of 1:5 acid is added below 15° C. The mixture is cooled 3-ethylureidoaniline in 25 ml. of 1:5 acid. The solution is neutralized to a brown color on Congo Red paper with ammonium acetate and allowed to couple 2 hours at ice bath temperature. The solution is drowned in water, the precipitated dye is filtered and washed with water.

The azo compound obtained gives bright red dyeings on polyester fibers and has the structure:

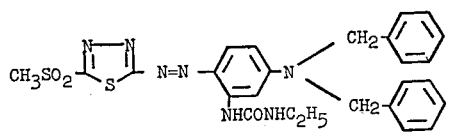

The thiadiazolylazo compounds described in the examples of Table III are prepared by the methods described in Examples 113 and 114 and conform to the formula

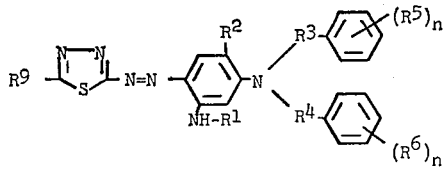

lent affinity for polyester fibers on which it produces fast, brilliant, red dyeings. This compounds has the structure:

The dyes of Table IV are prepared by the teachniques employed in Examples 113 and 114 by using the appropriate 5-amino-1,2,4-thiadiazole and 3-acylamido-N,N-di-

TABLE III

| Example No. | $R^9$ | $R^1$ | $R^2$ | $R^3$ | $R^4$ | $(R^5)_n$ | $(R^6)_n$ | Color |
|---|---|---|---|---|---|---|---|---|
| 115 | $CH_3S-$ | $-COCH_3$ | H | $-CH_2CH_2-$ | $-CH_2-$ | $-H$ | $-H$ | Red. |
| 116 | $CH_3S-$ | $-COCH_3$ | H | $-CH_2CH_2-$ | $-CH_2CH_2-$ | $-H$ | $-H$ | Red. |
| 117 | $CH_3S-$ | $-COCH_3$ | H | $-CH_2-$ | $-CH_2-$ | $4-CH_3$ | $4-CH_3$ | Red. |
| 118 | $CH_3S-$ | $-COCH_3$ | H | $-CH_2-$ | $-CH_2-$ | $2-Cl$ | $4-CH_3$ | Red. |
| 119 | $CH_3S-$ | $-COCH_3$ | $-OCH_3$ | $-CH_2-$ | $-CH_2-$ | $-H$ | $-H$ | Violet. |
| 120 | $CH_3S-$ | $-COCH_3$ | $-CH_3$ | $-CH_2-$ | $-CH_2-$ | $-H$ | $-H$ | Do. |
| 121 | $CH_3S-$ | $-COOC_2H_5$ | $-H$ | $-CH_2-$ | $-CH_2-$ | $-H$ | $-H$ | Red. |
| 122 | $C_2H_5S-$ | $-COC_6H_5$ | $-H$ | $-CH_2-$ | $-CH_2-$ | $-H$ | $-H$ | Red. |
| 123 | $C_2H_5S-$ | $-COC_6H_{11}$ | $-H$ | $-CH_2-$ | $-CH_2-$ | $-H$ | $-H$ | Red. |
| 124 | $NCC_2H_4S-$ | $-COCH_3$ | $-H$ | $-CH_2-$ | $-CH_2-$ | $-H$ | $-H$ | Red. |
| 125 | $NCC_2H_4S-$ | $-COCH_3$ | $-H$ | $-CH_2-$ | $-CH_2-$ | $4-CH_3$ | $-H$ | Red. |
| 126 | $n-C_4H_9S-$ | $-COCH_3$ | $-H$ | $-CH_2-$ | $-CH_2-$ | $4-CH_3$ | $-H$ | Red. |
| 127 | $-SC_6H_{11}$ | $-COCH_3$ | $-H$ | $-CH_2-$ | $-CH_2-$ | $-H$ | $-H$ | Red. |
| 128 | $-SO_2CH_3$ | $-COCH_3$ | $-OCH_3$ | $-CH_2-$ | $-CH_2-$ | $-H$ | $-H$ | Violet. |
| 129 | $-SO_2CH_3$ | $-COCH_3$ | $-CH_3$ | $-CH_3$ | $-CH_2-$ | $-H$ | $-H$ | Do. |
| 130 | $-C_6H_5$ | $-COCH_3$ | $-H$ | $-CH_2-$ | $-CH_2-$ | $-H$ | $-H$ | Red. |
| 131 | $-CH_3$ | $-COCH_3$ | $-H$ | $-CH_2-$ | $-CH_2-$ | $4-OH$ | $4-OH$ | Red. |
| 132 | $-C_2H_5$ | $-COCH_3$ | $-H$ | $-CH_2-$ | $-CH_2-$ | $4-OH$ | $4-OH$ | Red. |
| 133 | $-C_6H_4-p-Cl$ | $-COCH_3$ | $-H$ | $-CH_2-$ | $-CH_2-$ | $4-OH$ | $4-OH$ | Red. |
| 134 | $-C_6H_4-p-OCH_3$ | $-COCH_3$ | $-H$ | $-CH_2-$ | $-CH_2-$ | $-H$ | $-H$ | Red. |
| 135 | $-NHCOCH_3$ | $-COCH_3$ | $-H$ | $-CH_2-$ | $-CH_2-$ | $-H$ | $-H$ | Red. |
| 136 | $-Cl$ | $-COCH_3$ | $-H$ | $-CH_2-$ | $-CH_2-$ | $-H$ | $-H$ | Red. |
| 137 | $-Br$ | $-COCH_3$ | $-H$ | $-CH_2-$ | $-CH_2-$ | $-H$ | $-H$ | Red. |
| 138 | $-H$ | $-COCH_3$ | $-H$ | $-CH_2-$ | $-CH_2-$ | $-H$ | $-H$ | Red. |
| 139 | $-SCH_3$ | $-SO_2C_6H_4-p-CH_3$ | $-CH_3$ | $-CH_2-$ | $-CH_2-$ | $-H$ | $-H$ | Violet. |
| 140 | $-SCH_3$ | $-COC_2H_5$ | $-H$ | $-CH_2-$ | $-CH_2-$ | $-H$ | $-H$ | Red. |
| 141 | $-SCH_3$ | $-CHO$ | $-H$ | $-CH_2-$ | $-CH_2-$ | $-H$ | $-H$ | Red. |
| 142 | $-SCH_3$ | $-COOC_2H_5$ | $-OCH_3$ | $-CH_2-$ | $-CH_2-$ | $-H$ | $-H$ | Violet. |
| 143 | $CH_3S-$ | $-COCH_3$ | $-H$ | $-CH_2-$ | $-CH_2-$ | $4-CH_3$ | $-H$ | Red. |
| 144 | $CH_3S-$ | $-COCH_3$ | $-H$ | $-CH_2-$ | $-CH_2-$ | $4-Cl$ | $4-Cl$ | Scarlet. |
| 145 | $CH_3S-$ | $-COCH_3$ | $-H$ | $-CH_2-$ | $-CH_2-$ | $4-Cl$ | $-H$ | Do. |
| 146 | $C_6H_5CH_2S-$ | $-COCH_3$ | $-H$ | $-CH_2-$ | $-CH_2-$ | $4-Cl$ | $-H$ | Red. |
| 147 | $C_6H_5CH_2S-$ | $-COCH_3$ | $-H$ | $-CH_2-$ | $-CH_2-$ | $4-Cl$ | $-H$ | Red. |
| 148 | $C_6H_5CH_2S-$ | $-COCH_3$ | $-H$ | $-CH_2-$ | $-CH_2-$ | $4-Cl$ | $4-Cl$ | Scarlet. |
| 149 | $p-Cl-C_6H_4S-$ | $-COCH_3$ | $-H$ | $-CH_2-$ | $-CH_2-$ | $-H$ | $-H$ | Red. |
| 150 | $p-CH_3C_6H_4S-$ | $-COCH_3$ | $-H$ | $-CH_2-$ | $-CH_2-$ | $-H$ | $H$ | Red. |
| 151 | $-SCN$ | $-COCH_3$ | $-H$ | $-CH_2-$ | $-CH_2-$ | $-H$ | $-H$ | Red. |
| 152 | $-SCN$ | $-COCH_3$ | $-H$ | $-CH_2-$ | $-CH_2-$ | $4-OCH_3$ | $-H$ | Red. |
| 153 | $-SCN$ | $-COCH_3$ | $-H$ | $-CH_2-$ | $-CH_2-$ | $4-CH_3$ | $-H$ | Red. |
| 154 | $-SCN$ | $-COCH_3$ | $-H$ | $-CH_2-$ | $-CH_2-$ | $4-Cl$ | $4-Cl$ | Red. |
| 155 | $-S-CH_2COOC_2H_5$ | $-COCH_3$ | $-H$ | $-CH_2-$ | $-CH_2-$ | $-H$ | $-H$ | Red. |
| 156 | $-SC_2H_4OH$ | $-COCH_3$ | $-H$ | $-CH_2-$ | $-CH_2-$ | $-H$ | $-H$ | Red. |
| 157 | $-SC_2H_4OOCCH_3$ | $-COCH_3$ | $-H$ | $-CH_2-$ | $-CH_2-$ | $-H$ | $-H$ | Red. |
| 158 | $-SCH_2CN$ | $-COCH_3$ | $-H$ | $-CH_2-$ | $-CH_2-$ | $-H$ | $-H$ | Red. |
| 159 | $-SCH_2COC_6H_5$ | $-COCH_3$ | $-H$ | $-CH_2-$ | $-CH_2-$ | $-H$ | $-H$ | Red. |
| 160 | $-SC_2H_4Cl$ | $-COCH_3$ | $-H$ | $-CH_2-$ | $-CH_2-$ | $-H$ | $-H$ | Red. |
| 161 | $-SCH_2CH_2C_6H_5$ | $-COCH_3$ | $-H$ | $-CH_2-$ | $-CH_2-$ | $-H$ | $-H$ | Red. |

Example 162

5-amino-3-methylthio-1,2,4-thiadiazole (1.47 g.) is diazotized and coupled with 3-acetamido-N,N-dibenzylaniline (3.3 g.) according to the procedure employed in Example 113. The azo compound obtained possesses excelaralkylaniline. The compounds of Table IV conform to the formula

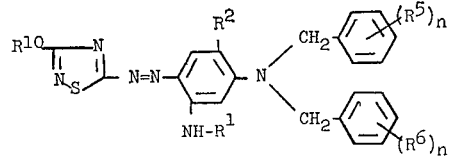

TABLE IV

| Example No. | $R^{10}$ | $R^1$ | $R^2$ | $R^3$ | $R^4$ | $(R^5)_n$ | $(R^6)_n$ | Color |
|---|---|---|---|---|---|---|---|---|
| 163 | $CH_3S-$ | $-COCH_3$ | $-H$ | $-CH_2CH_2-$ | $-CH_2-$ | $-H$ | $-H$ | Red. |
| 164 | $CH_3S-$ | $-COCH_3$ | $-H$ | $-CH_2CH_2-$ | $-CH_2CH_2-$ | $-H$ | $-H$ | Red. |
| 165 | $CH_3S-$ | $-COCH_3$ | $-H$ | $-CH_2-$ | $-CH_2-$ | $4-CH_3$ | $4-CH_3$ | Red. |
| 166 | $CH_3S-$ | $-COOC_2H_5$ | $-H$ | $-CH_2-$ | $-CH_2-$ | $4-CH_3$ | $4-CH_3$ | Red. |
| 167 | $CH_3S-$ | $-COC_6H_5$ | $-H$ | $-CH_2-$ | $-CH_2-$ | $2-Cl$ | $H$ | Red. |
| 168 | $CH_3S-$ | $-COC_6H_{11}$ | $-H$ | $-CH_2-$ | $-CH_2-$ | $3-CH_3$ | $H$ | Red. |
| 169 | $C_2H_5S-$ | $-COCH_3$ | $2-OCH_3$ | $-CH_2-$ | $-CH_2-$ | $4-OCH_3$ | $4-OCH_3$ | Violet. |
| 170 | $C_2H_5S$ | $-COCH_3$ | $2-OCH_3$ | $-CH_2-$ | $-CH_2-$ | $-H$ | $-H$ | Do. |
| 171 | $CH_3SO_2-$ | $-COCH_3$ | $-H$ | $-CH_2-$ | $-CH_2-$ | $-H$ | $-H$ | Do. |
| 172 | $CH_3SO_2-$ | $-COOC_2H_5$ | $-H$ | $-CH_2-$ | $-CH_2-$ | $-H$ | $-H$ | Do. |
| 173 | $CH_3SO_2-$ | $-SO_2CH_3$ | $-H$ | $-CH_2-$ | $-CH_2-$ | $-H$ | $-H$ | Do. |
| 174 | $CH_3-\overset{CH_3}{\underset{|}{CH}}-S$ | $-COCH_3$ | $-H$ | $-CH_2-$ | $-CH_2-$ | $-H$ | $-H$ | Red. |
| 175 | $n-C_4H_9S-$ | $-COCH_3$ | $-H$ | $-CH_2-$ | $-CH_2-$ | $-H$ | $-H$ | Red. |
| 176 | $CH_3S-$ | $-CHO$ | $-H$ | $-CH_2-$ | $-CH_2-$ | $-H$ | $-H$ | Red. |
| 177 | $CH_3S-$ | $-COCH_3$ | $-H$ | $-CH_2-$ | $-CH_2-$ | $-H$ | $4-Cl$ | Red. |
| 178 | $CH_3S-$ | $-SO_2C_6H_4-p-CH_3$ | $-H$ | $-CH_2-$ | $-CH_2-$ | $-H$ | $4-Cl$ | Red. |
| 179 | $CH_3S-$ | $-NHCONHC_2H_5$ | $-H$ | $-CH_2-$ | $-CH_2-$ | $-H$ | $4-Cl$ | Red. |
| 180 | $CH_3S-$ | $-COOCH_3$ | $-H$ | $-CH_2-$ | $-CH_2-$ | $-H$ | $4-Cl$ | Red. |
| 181 | $CH_3S-$ | $-COOC_4H_9-n$ | $-H$ | $-CH_2-$ | $-CH_2-$ | $-H$ | $4-Cl$ | Red. |
| 182 | $C_6H_5CH_2S-$ | $-COCH_3$ | $-H$ | $-CH_2-$ | $-CH_2-$ | $-H$ | $4-Cl$ | Red. |
| 183 | $p-Cl-C_6H_4CH_2S-$ | $-COCH_3$ | $-H$ | $-CH_2-$ | $-CH_2-$ | $-H$ | $-H$ | Red. |
| 184 | $p-CH_3C_6H_4CH_2S-$ | $-COCH_3$ | $-H$ | $-CH_2-$ | $-CH_2-$ | $-H$ | $-H$ | Red. |
| 185 | $O-CH_3-C_6H_4CH_2S-$ | $-COCH_3$ | $-H$ | $-CH_2-$ | $-CH_2-$ | $-H$ | $-H$ | Red. |

Example 186

To 5 ml. of conc. $H_2SO_4$ is added portionwise 0.72 g. of $NaNO_2$ with stirring. The nitrosyl sulfuric acid solution is cooled and 10 ml. of 1:5 acid (1 part propionic: 5 parts acetic) is added below 15° C. To this is added 2.00 g. 2-amino-3-nitro-5-propionylthiophene followed by 10 ml. of 1:5 acid, all at 0–5° C. The reaction is stirred at 0–5° C. for 1 hr. The diazonium solution was added to a chilled solution of 3.30 g. of 3-acetamido-N,N-dibenzylaniline dissolved in 75 ml. of 1:5 acid. The coupling mixture is stirred occasionally for 1 hr., and is then drowned with water. The blue azo compound is collected by filtration, washed with water, and air dried. It produces heavy blue shades on polyester fibers and has outstanding light and sublimation fastness. The structure of the product is:

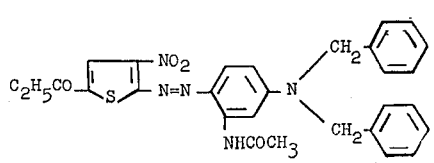

Example 187

2-amino-5-isobutyryl-3-nitrothiophene (2.14 g) is diazotized and coupled with 3.30 g. of 3-acetamido-N,N-dibenzylaniline as described in Example 186. This compound has excellent light fastness and resistance to sublimation when dyed on polyester fibers.

The thienylazo compounds appearing in Table V are prepared by the method employed in Example 186 and have the general formula

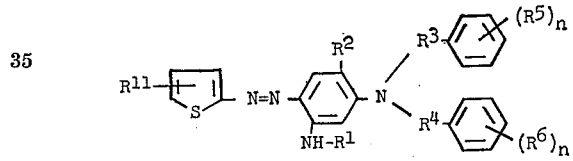

TABLE V

| Example No. | $R^{11}$ | $R^1$ | $R^2$ | $R^3$ | $R^4$ | $(R^5)_n$ | $(R^6)_n$ | Color |
|---|---|---|---|---|---|---|---|---|
| 188 | $5-CH_3CO-3-NO_2$ | $-COC_2H_5$ | $-H$ | $-CH_2-$ | $-CH_2CH_2-$ | $-H$ | $-H$ | Blue. |
| 189 | $5-CH_3CO-3-NO_2$ | $-COOC_2H_5$ | $-H$ | $-CH_2-$ | $-CH_2-$ | $-H$ | $-H$ | Do. |
| 190 | $5-CH_3CO-3-NO_2$ | $-COC_6H_5$ | $-H$ | $-CH_2-$ | $-CH_2-$ | $-H$ | $-H$ | Do. |
| 191 | $5-CH_3CO-3-NO_2$ | $-SO_2CH_3$ | $-H$ | $-CH_2-$ | $-CH_2-$ | $-H$ | $-H$ | Do. |
| 192 | $3,5-di-CH_3SO_2$ | $-COCH_2Cl$ | $-H$ | $-CH_2-$ | $-CH_2-$ | $-H$ | $-H$ | Do. |
| 193 | $5-CH_3CO-3-NO_2$ | $-COCH_2OCH_3$ | $-H$ | $-CH_2-$ | $-CH_2-$ | $-H$ | $-H$ | Do. |
| 194 | $5-CH_3CO-3-NO_2$ | $-COCH_2SCH_3$ | $-H$ | $-CH_2-$ | $-CH_2-$ | $-H$ | $-H$ | Do. |
| 195 | $5-CH_3CO-3-NO_2$ | $-CONHC_2H_5$ | $-H$ | $-CH_2-$ | $-CH_2-$ | $-H$ | $-H$ | Do. |
| 196 | $5-CH_3CO-3-NO_2$ | $-COCH_3$ | $-H$ | $-CH_2-$ | $-CH_2-$ | $-H$ | $-H$ | Do. |
| 197 | $5-CH_3CO-3-NO_2$ | $-COCH_3$ | $-OCH_3$ | $-CH_2-$ | $-CH_2-$ | $4-OCH_3$ | $-H$ | Turquoise. |
| 198 | $5-CH_3CO-3-NO_2$ | $-COCH_3$ | $-OCH_3$ | $-CH_2-$ | $-CH_2-$ | $4-OCH_3$ | $-H$ | Do. |
| 199 | $5-CH_3CO-3-NO_2$ | $-COCH_3$ | $-OCH_3$ | $-CH_2-$ | $-CH_2-$ | $4-Cl$ | $-H$ | Do. |
| 200 | $5-CH_3CO-3-NO_2$ | $-COCH_3$ | $-CH_3$ | $-CH_2-$ | $-CH_2-$ | $-H$ | $-H$ | Blue. |
| 201 | $5-CH_3CH_2CO-3-NO_2$ | $-COCH_3$ | $-H$ | $-CH_2-$ | $-CH_2-$ | $4-OCH_3$ | $-H$ | Do. |
| 202 | $5-C_2H_5NHSO_2-3-NO_2$ | $-COCH_3$ | $-H$ | $-CH_2-$ | $-CH_2-$ | $4-CH_3$ | $-H$ | Do. |
| 203 | $5-CH_3CH_2CO-3-NO_2$ | $-COCH_3$ | $-H$ | $-CH_2CH_2-$ | $-CH_2CH_2-$ | $-H$ | $-H$ | Do. |
| 204 | $5-CH_3CH_2CO-3-NO_2$ | $-COCH_3$ | $-H$ | $-CH_2-$ | $-CH_2-$ | $3-CH_3$ | $3-CH_3$ | Do. |
| 205 | $5-CH_3CH_2CO-3-NO_2$ | $-COCH_3$ | $-H$ | $-CH_2-$ | $-CH_2-$ | $4-Cl$ | $4-Cl$ | Do. |
| 206 | $5-(CH_3)_2CH-CO-3-NO_2$ | $-COCH_3$ | $-H$ | $-CH_2-$ | $-CH_2-$ | $4-Cl$ | $4-Cl$ | Do. |
| 207 | $3-NO_2$ | $-COC_2H_4Cl$ | $-H$ | $-CH_2-$ | $-CH_2-$ | $-H$ | $-H$ | Do. |
| 208 | $5-(CH_3)_2CH-CO-3-NO_2$ | $-COC_2H_4Cl$ | $-H$ | $-CH_2-$ | $-CH_2-$ | $-H$ | $-H$ | Do. |
| 209 | $5-(CH_3)_2CH-CO-3-NO_2$ | $-COCH_3$ | $-OC_2H_5$ | $-CH_2-$ | $-CH_2-$ | $-H$ | $-H$ | Turquoise. |
| 210 | $3,5-di-NO_2$ | $-COCH(CH_3)_2$ | $-H$ | $-CH_2-$ | $-CH_2-$ | $-H$ | $-H$ | Blue-green. |
| 211 | $5-CH_3(CH_2)_2CO-3-NO_2$ | $-COCH_3$ | $-H$ | $-CH_2-$ | $-CH_2-$ | $-H$ | $-H$ | Blue. |
| 212 | $5-CH_3(CH_2)_2CO-3-NO_2$ | $-CONHC_2H_5$ | $-H$ | $-CH_2-$ | $-CH_2-$ | $-H$ | $-H$ | Do. |
| 213 | $5-COOC_2H_5$ | $-CHO$ | $-H$ | $-CH_2-$ | $-CH_2-$ | $-H$ | $-H$ | Red. |
| 214 | $5-CH_3(CH_2)_2CO-3-NO_2$ | $-CONHCH_3$ | $-H$ | $-CH_2-$ | $-CH_2-$ | $-H$ | $-H$ | Blue. |
| 215 | $5-C_2H_5OOC-3-NO_2$ | $-SO_2CH_3$ | $H$ | $-CH_2-$ | $-CH_2-$ | $-H$ | $-H$ | Do. |
| 216 | $5-C_6H_5CO-3-NO_2$ | $-COC_6H_5$ | $H$ | $-CH_2-$ | $-CH_2-$ | $-H$ | $-H$ | Do. |

Example 217

Ten ml. of 1:5 acid (1 part propionic:5 parts acetic) are added to a solution of nitrosylsulfuric acid prepared from sodium nitrite (0.72 g.) and sulfuric acid (5 ml.). The solution is cooled to 3° C. and 3-aminopyrazole-4-carboxylic acid methyl ester (1.41 g.) is added below 5° C. followed by a second portion of 1:5 acid (10 ml.) at the same temperature. The diazotization is completed by stirring for two hours at 3–5° C. This diazo solution is added to a cooled solution of 3.86 g. 3-acetamido-N,N-di-p-tolylmethylaniline in 1:5 acid (100 ml.). The mineral acid is neutralized by the addition of solid ammonium acetate maintaining the temperature at 10° C. or below. When the coupling is complete, water (500 ml.) is added with good stirring. The precipitated yellow solid is collected and washed well with water. The azo compound imparts yellow shades to polyester fibers and has the structure:

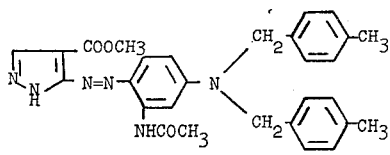

The azo compounds of the examples in Table VI give yellow dyeings on polyester fibers and conform to the formula

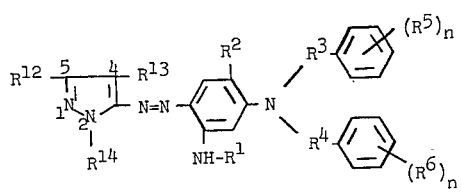

The azo compounds of Table VI are prepared by the procedure disclosed in Example 217.

Example 229

A mixture of:

500 mg. of the compound of Example 113, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a microsize container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing 1 ml. of a complex diaryl sulfonate surfactant, (compound 8–S), 3 ml. of a 3% solution of a sodium N-methyl-N-oleoyltaurate (Igepon T–S1).

8 ml. of a 25% solution of natural gums (Superclear 8ON), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

10 g. of a fabric of poly(ethylene terephthalate) fibers and 10 g. of a fabric of 65/35 spun poly(ethylene tereph-

TABLE VI

| Example No. | $R^{12}$ | $R^{13}$ | $R^{14}$ | $R^1$ | $R^2$ | $R^3$ | $R^4$ | $(R^5)_n$ | $(R^6)_n$ |
|---|---|---|---|---|---|---|---|---|---|
| 218 | H | —CN | H | —COCH₃ | H | —CH₂— | —CH₂— | —H | —H |
| 219 | H | —COOC₂H₅ | —C₆H₅ | —COOC₂H₅ | H | —CH₂CH₂— | —CH₂CH₂— | —H | —H |
| 220 | H | —COOCH(CH₃)₂ | —SO₂C₆H₅ | —COC₆H₅ | H | —CH₂— | —CH₂— | 4-OC₂H₅ | 4-OC₂H |
| 221 | H | —NO₂ | —C₆H₅ | —SO₂CH₃ | —OCH₃ | —CH₂— | —CH₂— | —H | —H |
| 222 | H | —CONH₂ | —C₂H₅ | —SO₂C₆H₅ | H | —CH₂— | —CH₂— | 2,4-di-OH | —H |
| 223 | —CN | —CN | —SO₂C₆H₅ | —COC₆H₄-p-CH₃ | H | —CH₂— | —CH₂— | —H | —H |
| 224 | H | —CONH₂ | —SO₂C₂H₅ | —CONHC₂H₅ | H | —CH₂— | —CH₂— | —H | —H |
| 225 | —CH₃ | —CN | —CH₃ | —COCH₃ | H | —CH₂— | —CH₂CH₂— | —H | —H |
| 226 | H | —COOCH₃ | H | —COCH₃ | H | —CH₂— | —CH₂— | —H | —H |
| 227 | H | —COOCH₃ | H | —COC₆H₅ | H | —CH₂— | —CH₂— | —H | —H |

The compounds of the invention can be used for dyeing linear polyester textile materials in the manner described in U.S. Pats. 2,880,050, 2,757,064, 2,782,187 and 3,043,827. The novel monoazo compounds are water-insoluble, i.e. substantially water-insoluble, and therefore they can be applied to polyester fibers according to conventional disperse dyeing techniques. The following example illustrates a carrier dyeing procedure for applying the azo compounds of the invention to dye polyester textile materials.

Example 228

An amount of 0.1 g. of the azo compound is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of a solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for the removal of residual carrier) for 5 minutes at 350° C.

The compounds of the invention can also be applied to polyester textile materials by the heat fixation technique described in U.S. Pat. 2,663,612 and in the American Dye-Stuff Reporter, 42, 1 (1953). The following procedure describes how the azo compounds of the invention can be applied to polyester materials by the heat fixation technique.

thalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly (ethylene terephthalate) polyester fibers are described, $R^1$ is lower alkanoyl, benzoyl, lower alkylsulfonyl, lower alkoxycarbonyl, or lower alkylcarbamoyl; and $R^5$ and $R^6$ each is hydrogen, methyl, methoxy, or halogen.

6. A compound according to claim 1 having the formula

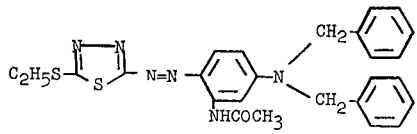

7. A compound according to claim 1 having the formula

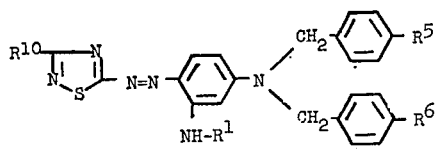

wherein $R^{10}$ is lower alkylthio or lower alkylsulfonyl;

$R^1$ is lower alkanoyl, benzoyl, lower alkoxycarbonyl, lower alkylsulfonyl, or lower alkylcarbamoyl; and $R^5$ and $R^6$ each is hydrogen, methyl, methoxy, or halogen.

8. A compound according to claim 1 having the formula

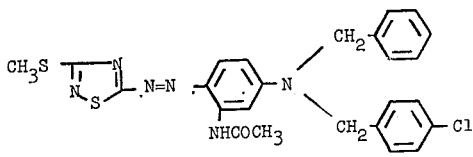

9. A compound according to claim 1 having the formula

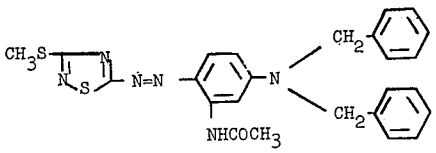

References Cited

UNITED STATES PATENTS

| | | | |
|---|---|---|---|
| 2,864,812 | 12/1958 | Bossard et al. | 260—158 X |
| 3,101,988 | 8/1963 | Bossard et al. | 260—158 X |
| 3,132,132 | 5/1964 | Suzuki et al. | 260—158 |
| 3,336,286 | 8/1967 | Sartori | 260—158 |
| 3,483,180 | 12/1969 | Ramanathan | 260—158 |

FLOYD DALE HIGEL, Primary Examiner

U.S. Cl. X.R.

8—4, 41 C; 117—138.8 F; 260—40 R, 152, 163, 302 R, 302 D, 305, 310 R, 329 AM, 329 S, 332.3 R, 347.5, 556 AR, 557 R, 558 R, 562 N, 570.5 P, 570.9